United States Patent [19]

Stockham, Jr. et al.

[11] 4,433,348
[45] Feb. 21, 1984

[54] APPARATUS AND METHOD FOR REQUIRING PROPER SYNCHRONIZATION OF A DIGITAL DATA FLOW

[75] Inventors: Thomas G. Stockham, Jr.; Bruce C. Rothaar, both of Salt Lake City, Utah

[73] Assignee: Soundstream, Inc., Salt Lake City, Utah

[21] Appl. No.: 299,829

[22] Filed: Sep. 8, 1981

Related U.S. Application Data

[62] Division of Ser. No. 55,689, Jul. 6, 1979, Pat. No. 4,328,689.

[51] Int. Cl.³ ............................................. G11B 5/09
[52] U.S. Cl. ........................................ 360/51; 360/40
[58] Field of Search ...................... 360/40, 48, 49, 50, 360/51

[56] References Cited

U.S. PATENT DOCUMENTS 3,916,440 10/1975 Irwin ..................................... 360/50
4,321,632 3/1982 Leis ....................................... 360/50

*Primary Examiner*—Vincent P. Canney
*Attorney, Agent, or Firm*—M. Reid Russell; Robert R. Mallinckrodt

[57] ABSTRACT

The synchronization circuitry can be described as operating in essentially four states and is particularly useful at startup, to locate synchronization codes and spacing there between in the data flows. In operation, the synchronization circuitry looks in a data flow at startup for any sync code and, when such sync code is found, counts ahead to where the next sync code should be. If a proper sync code is found, again the circuitry counts ahead to where the next sync code should be, continuing looking at points along the data flow until a certain number (n) of properly located sync codes are discovered whereat synchronization is declared and normal playback is ordered. However, if sync codes are not located where they should be in the data flow, then such failures are subtracted from success until either (n) successes are found or a total of successes less failures reaches zero whereat the circuitry returns to the first state of looking for any sync code.

4 Claims, 7 Drawing Figures

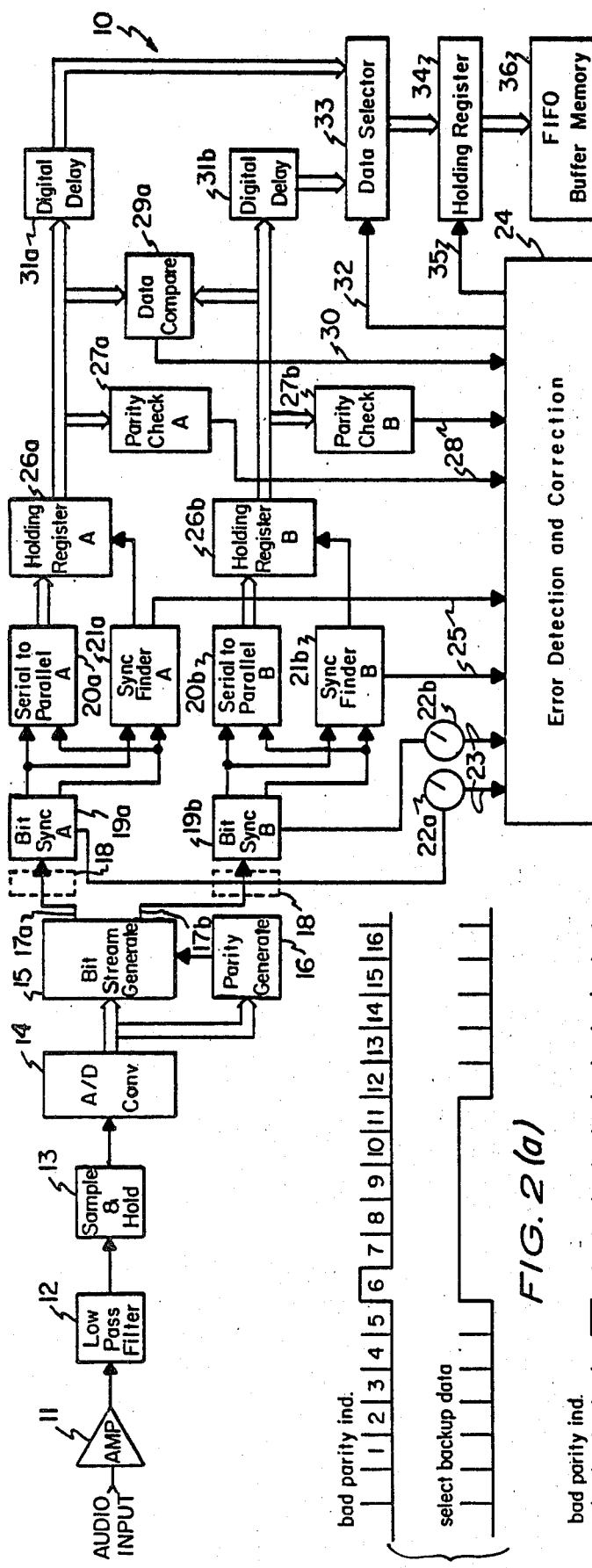

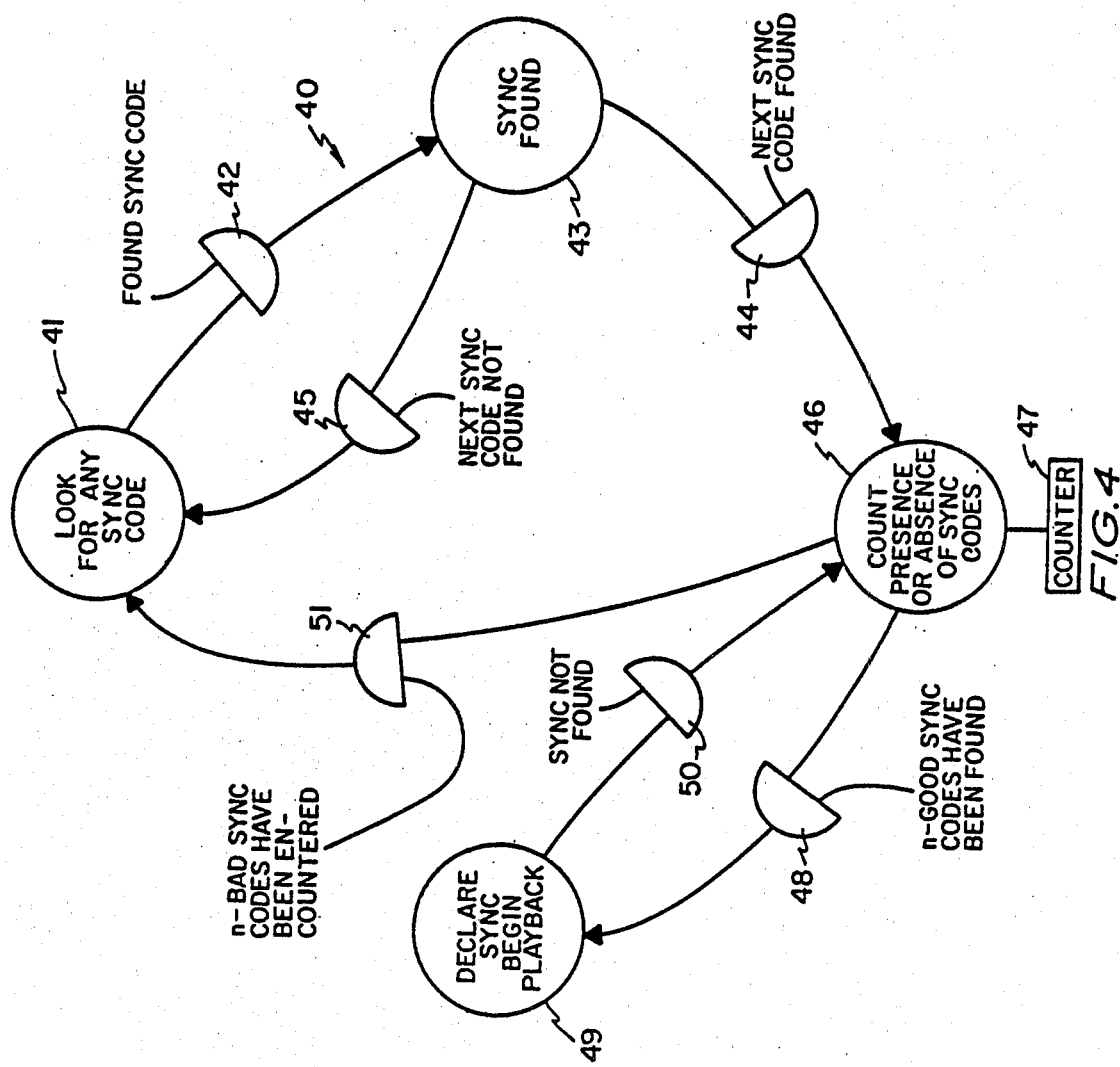

APPARATUS AND METHOD FOR REQUIRING PROPER SYNCHRONIZATION OF A DIGITAL DATA FLOW

This application is a division of Ser. No. 055,689 filed July 6, 1979, and now U.S. Pat. No. 4,328,689.

BACKGROUND OF THE INVENTION

1. Field

This invention relates to data analysis schemes for use in a multichannel digital tape recorder.

2. Background of the Invention

The present invention involves apparatus for performing digital recording of analog information and is particularly suited to reproduction of audio information. Apparatus and a method for providing a faithful information reproduction was disclosed in an earlier United States Patent entitled, "Apparatus and Method For Providing Error Recognition and Correction of Recorded Digital Information", invented by one of the present inventors, U.S. Pat. No. 4,202,018 issued May 6, 1980 and the original application that this application is a divisional application of has issued as a patent entitled "Apparatus and Improved Method For Processing of Digital Information", U.S. Pat. No. 4,328,580 issued May, 1982. The present invention preferably utilizes certain of the circuitry and error detection/correction techniques disclosed in these United States Patents.

3. Prior Art

As detailed in the above-cited earlier United States Patents, there are numerous advantages to reproducing audio information in a digital form. The present invention preferably incorporates a full reproduction of primary data on a backup track, and recognizes that such exact reproduction and substitution, where appropriate, of backup for primary data on discovery of an error, is not in itself new. Such is well known in the art and is known in patents by Dirks, U.S. Pat. No. 3,281,804, Hendrichs, et al., U.S. Pat. No. 3,665,430 and Gabor U.S. Pat. No. 3,264,623. The present invention includes a new synchronization code format and a system for more rapidly and accurately locating and locking onto synchronization coding to prevent a premature declaration of synchronization, particularly upon startup which arrangement is believed to be unique.

It is, therefore, a principal object of the present invention to provide circuitry for rapidly acquiring synchronization, particularly at startup, that includes an arrangement wherein acquired synchronization codes and the spacing therebetween are checked for a number of data groups or words before synchronization is declared.

In accordance with the above object, with a use of alternating synchronization coding, the present invention, to lock onto proper spacing between data words as soon as possible during playback, provides synchronization engine circuitry. This circuitry can be described as operating in essentially four states and is particularly useful at startup, to locate synchronization codes and spacing therebetween in the data flows. In operation, the synchronization engine looks in a data flow at startup for any sync code and, when such sync code is found, counts ahead to where the next sync code should be. If a proper sync code is found, again the circuitry counts ahead to where the next sync code should be, continuing looking at point along the data flow until a certain number (n) of properly located sync codes are discovered whereat synchronization is declared and normal playback is ordered. However, if sync codes are not located where they should be in the data flow, then such failures are subtracted from successes until either (n) successes are found or a total of successes less failures reaches zero whereat the circuitry returns to the first state of looking for any sync code. This circuitry and its functioning provides for a more positive location of synchronization within the shortest period of time possible so as to prevent declaring synchronization prematurely and creating thereby unwanted noise.

THE DRAWINGS

In the drawings is shown that which is presently regarded as the best mode for carrying out the invention.

FIG. 1, is a block schematic of a single channel of a multi-channel digital tape recorder, that should be understood to receive data, in the form of an analog signal, to process and convert that signal to digital form and to record in duplicate, that information on two tracks, the Figure showing inputs, and circuitry associated with the data conversion, recording, error detection/correction and playback and further shows, in schematic, circuitry to perform look-behind and look-ahead schemes;

FIG. 2(a), shows a schematic of a flow of main track data words 1 through 16, with data word 6 identified as containing a bad parity indicator that results in generation of command to thereafter select data on a backup track which command is shown therein to continue for a number of following data words illustrating a look-behind scheme;

FIG. 2(b), shows a schematic of the flow of main track data words of FIG. 2(a), showing the same error indication in block 6, which block 6 error is shown sensed before block 6 arrives at a point in the flow where a selection decision is required, resulting in a command to select backup track data for a number of data words prior to the error indication, illustrating a look-ahead scheme;

FIG. 2(c), shows a combination of the flows of FIGS. 2(a) and 2(b);

FIG. 3(a), a schematic representation of a signal train of data words arranged between conventional synchronization codes;

FIG. 3(b), a schematic like that of FIG. 3(a) only showing what appears to be a synchronization code within a data word;

FIG. 3(c), a schematic like that of FIGS. 3(a) and 3(b) only showing alternating synchronization codes arranged between each data word; and FIG. 4, a block schematic function flow of synchronization engine circuitry of the present invention.

DETAILED DESCRIPTION

Referring now to the drawing:

In FIG. 1, is shown a block schematic that illustrates a signal flow through a single channel 10 that should be understood to be one channel of a multiple channel digital tape recorder of the present invention. The single channel 10 shown in FIG. 1 is representative of each channel of such multi-channel digital tape recorder, which digital tape recorder is preferably arranged to involve a non-return to zero (NRZ) recording.

In the schematic of the schematic of FIG. 1 the blocks shown and identified therein should be understood to be indicative of standard electrical circuits and, as appropriate, are essentially like the circuits shown and described in the United States Patent entitled "Apparatus and Method for Providing Error Recognition and Correction of Recorded Digital Information", U.S. Pat. No. 4,202,018, cited earlier herein.

The present invention includes a combination of circuitry that together function uniquely, as will be described, and so specific electrical components within a block of circuitry, their connections, and individual operations, except where appropriate, will not be shown in detail herein.

In the single channel 10 schematic of FIG. 1, reading from left to right therein, an audio input is shown passed into an amplifier 11. It should, however, be understood that any analog signal input would be appropriate for processing within and by the present invention. For purposes of this disclosure the signal input will be assumed to be an audio signal as from a musical performance. The amplifier 11 conventionally increases the strength of the received signal and passes it to a low pass filter 12 wherein frequencies above so called Niquist Frequency are filtered out. Such signal filtration is to prevent aliasing in the sample and hold and analog to digital conversion circuitry to follow.

From the low pass filter 12 the signal passes to a sample and hold circuit 13 wherein is contained a clock, not shown, that is part of a record control to provide clocking pulses that are imposed upon the input signals and function as timing pulses to control the operation of an analog to digital converter circuit that is shown in FIG. 1 and hereinafter referred to as an A/D converter 14. In A/D converter 14, under the control of the clocking pulses, the analog signal is converted to digital form; perferably increments of the analog signal are represented as 16-bit data words, and each data word is fed, at intervals, simultaneously into a bit stream generator 15 and into a parity generator 16. The bit stream generator 15 rearranges the parallel data words into a serial configuration and synchronization or sync codes are included therewith. A parity bit is included therein by parity generator 16 and the bit stream generator 15 duplicates each data word for simultaneous recording on main and backup tracks. The data words with parity and sync codes therein from the bit stream generator travel, as shown, through lines 17a and 17b to a conventional recorder, not shown, that records the serial information, as main and backup track flows, onto a permanent media. The permanent media, as shown in FIG. 1 as broken line boxes, is preferably magnetic tape 18.

So arranged, the main and backup track data flows are recorded on magnetic tape 18 alongside one another and spaced apart such that a data loss on one track, as with a tape defect, or the like, will not necessarily extend to the other track. A loss of data, error, or the like, occurring on the main track will cause or trigger a switching of the playback to the backup track and, of course, if a problem occurs with the backup track, the main track data will continue to be passed for playback. So arranged, a loss on one track only will not result in an unrecoverable loss of information.

Shown in FIG. 1, serial information is taken off from magnetic tape 18 by bit synchronizers A and B, 19a and 19b, whereat the signal quality of each main and backup track data flow is checked, as indicated by meters 22a and 22b, and that information passed through lines 23 for evaluation, in error detection and correction circuitry 24. Meters 22a and 22b should be understood to be symbolic of apparatus for performing signal quality evaluation and should not be understood to limit such signal quality evaluation to tests performed by a meter only.

From the bit sync 19a and 19b, the main and backup track information A and B is passed to serial to parallel converters 20a and 20b and sync finder circuitry 21a and 21b that are also connected together. The serial to parallel converters 20a and 20b, reconvert the data to parallel arrangement for passage to a holding register 26a and 26b and simultaneously, to the sync finders 21a and 21b. The sync finders 21a and 21b look for the presence of proper synchronization codes between data words and information about the presence or absence of the proper synchronization codes is passed to error detection and correction circuitry 24. Sync finder circuitry 21a and 21b in the present invention preferably include synchronization engine circuitry 40, shown in FIG. 4. At system startup, the synchronization engine 40 utilizes the sync finder to rapidly locate what appears to be a valid synchronization or sync code and will count from that sync code, a certain number of bits, as say the 20 bits per word of the present invention, and will then look for another proper sync code. This process is repeated until either a set number (n) of properly located sync codes are found or a sum of the proper sync codes less erroneous sync codes found equals zero whereupon "sync not found" is declared and the sync finder 21a and 21b is directed to again search to locate a proper sync code.

Further, as part of a preferred data format of the present invention, as will be discussed later herein with respect to FIGS. 3(a) through 3(c), the present invention preferably employs an arrangement for alternating sync coding between each data word for more accurately obtaining synchronization. It should be understood that the alternating sync coding is first recorded on the magnetic tape 18 and is picked up by bit synchronizers 17a and 17b and scanned by sync finders 21a and 21b.

Sync finders 21a and 21b are also connected to main and backup track holding registers A and B, shown at 26a and 26b, that synchronize the two flows for passage to digital delay circuitry 31a and 31b. Also, the data flows from holding registers 26a and 26b, prior to their reaching the digital delay circuitry, are each evaluated by parity check circuitry 27a and 27b, wherein a check is made that a proper parity bit is present in each data word, and data compare circuitry 29a. Information concerning the presence or absence of a proper parity bit in each data word is passed from parity check circuitry 27a and 27b through lines 28 to error detection and correction circuitry 24. Also, prior to the signals reaching digital delay circuitry 31a and 31b, a comparison of the data on the main and backup tracks or A and B tracks, is made at data compare circuitry 29a, with information about that comparison passed through line 30 to the error detection and correction circuitry 24.

Shown in FIG. 1, main and backup track information is passed through digital delay circuits 31a and 31b prior to the data reaching the data select circuit 33, in which digital delay circuits a delay is created between when a selection determination is made and when the particular data word actually reaches the data selector circuitry 33. Therefore, as shown best in FIG. 2(b), by creating a delay before a problem is sensed on one track, a data selection can be made in anticipation of an error before the particular questionable data word actually needs to be acted upon. FIG. 2(b) shows an illustration of how an error sensed as a parity error in a main track data word causes or triggers selection of, as shown in the lowerline thereof, a number of backup track data words immediately preceding that bad data word. Such early selection of backup track data over main track data assumes, as it has been found in practice, that errors occur in series. Therefore, such early selection anticipates the occurrence of other errors and is to minimize a chance for distortion, to provide for a best possible data reproduction by switching from one track to the other in anticipation of a problem. A combination of FIGS. 2(a) and 2(b) is shown in FIG. 2(c) wherein the digital delay circuitry 31a and 31b and data selector circuitry 33 provide both a holding in of an error and selection of backup track data words before and after an error occurs, providing "look behind" and "look ahead" functions to insure a most faithful data reproduction possible. Utilizing this approach, main track data, before a dropout and after one has occurred, is not used. The data selected therefore has a greater likelihood of being correct than was heretofore possible.

Shown in FIG. 1, from the data selector circuitry 33, the selected data word flow passes to a holding register 34 that also receives commands or signals through line 35 from the error detection/correction circuit 24. When and if the holding register 34 is informed by the error detection/correction circuit 24 that a fatal dropout has occurred on both main and backup tracks, and therefore neither main or backup track data is usable, it will hold and pass the last good data word until notified that correct data is available.

From the holding register 34, the signal is passed to a FIFO, or first-in-first-out, buffer memory 36 that is connected, not shown, to the tape drive for controlling speed thereof. So arranged, as will be explained in detail later herein, the FIFO buffer memory 36 controls the tape speed to maintain a certain percentage fullness. That fullness is compared with buffer memory fullness of the other channels, not shown, for synchronizing recording of information recorded on the tape so that it may be played back in synchronization. The preferred arrangement of the buffer memory 36 in conjunction with other buffer memories for providing tape speed control.

As was mentioned earlier herein, the present invention, with respect to FIGS. 3(a) through 3(c) also includes, as a preferred data recording format, alternating synchronization or sync codes to facilitate location and pickup thereof to minimize a potential for an erroneous sync identification. FIG. 3(a) shows a conventional or common digital sync coding arrangement as consisting of a 110 followed by a data word containing also a parity bit. Shown in FIG. 3(b), the data word itself is shown as also containing a 110 that could erroneously be picked up as sync code during startup or recovery from a dropout that would cause a restart of sync locator circuitry and a data loss. FIG. 3(c) shows a preferred sync code arrangement where sync codes are alternated, one after another. So arranged, starting with 110 as the sync code, the following sync code would be 001. In FIG. 3(c), the same false sync signal shown in FIG. 3(b) is repeated, but would not be picked up as a sync code because of the alternating code arrangement of the present invention. Of course, so arranged, the sync finder 21a or 21b will be programmed to pickup the alternating bits as proper sync codes.

As detailed earlier herein with respect to FIG. 1, the sync finders 21a and 21b look for the presence of proper synchronization codes between data words. The present invention, as shown best in FIG. 4, preferably also includes within the finder circuitry, circuitry identified hereinafter as sync engine 40. FIG. 4 shows a schematic wherein is detailed the function of that sync engine 40, which circuitry should be understood to consist of arrangements of electronic components that are not in themselves unique, but are unique in combination for performing the functions detailed hereinafter with respect to FIG. 4. Sync engine 40 operates in essentially four states, analyzing each data word from the bit synchronizer and, as illustrated in block 41, looks for any synchronization code therein. As detailed earlier herein, such synchronization code can be alternated as say between 110 and 001 and so the sync engine would preferably provide for searching for alternating sync codes. A locating of a sync code as illustrated at 42 causes a transition to block 43. However, if a sync code is not found, a transition is made back to block 41 to restart looking for any sync code. This may be the result of engine 40 locating a false sync code within the data bits upon startup. The finding of a next sync code causes a transition, via block 44, to block 46 wherein the presence or absence of sync codes are counted by a counter 47. When a number (n) is received, the condition of block 49 is invoked, declaring sync code found and the beginning of playback. If a single bad sync code is encountered, the counting state, the condition of block 41, in invoked, via 51, commanding a restart of the looking for any sync code. So arranged, if a number of bad sync codes are encountered where the sum of the good and bad sync codes are encountered where the sum of the good and bad sync codes equal zero, then the sync engine 40 reverts to looking for any sync code mode, its first state of operation, as illustrated by block 41. If (n) good sync codes are discovered, the fourth state is invoked where normal playback is initiated as illustrated by block 49.

The schematic of FIG. 4 illustrates the four states of operation of the sync engine 40, which sync engine is preferably incorporated within the sync finders 21a and 21b circuitry that has been discussed with respect to FIG. 1. While the described arrangement and functioning of sync engine 40 is preferred it should be obvious that sync finder circuitry could be employed alone and, particularly with the preferred alternating sync format of the present invention, would constitute a satisfactory sync locator system. Sync engine 40 therefore provides an improved arrangement for accurately identifying synchronization coding to obtain as faithful a playback of recorded information as possible.

Summarizing, the present invention preferably utilizes a synchronization code format for facilitating and insuring that proper sync codes will be identified as early in the playback mode as possible to reduce information loss, which synchronization code format is used with synchronization engine circuitry that operates in four states to facilitate accurate acquisition of synchronization.

While a preferred embodiment of our invention and method has been shown and described herein, it should be obvious that this disclosure is made by way of example and variations are possible without departing from subject matter coming within the scope of the following claims, which claims we regard as our invention.

We claim:

1. Apparatus for arrangement in a digital tape recorder for accurately acquiring proper synchronization for playback of a digital data flow at startup including,
   means for identifying synchronization codes in data words in a digital data flow;
   means for locking onto an identified synchronization code;
   locator means arranged for counting a certain number of bits from said identified synchronization code to look for a following synchronization code;
   counter means arranged for counting the numbers of properly located synchronization codes and failures to locate synchronization codes, which counter means will subtract the failures to locate from the properly located synchronization codes; and
   declaration means arranged to receive from said counter means the number of properly located synchronization codes less the failures to locate for, when a certain number of properly located synchronization codes are located, declaring synchronization and initiating recorder playback and, when the number of properly located synchronization codes less the failures to locate reaches zero, declaring synchronization not found and reactivating the means for identifying any synchronization code.

2. Apparatus for processing digital information as recited in claim 1, wherein
   the recorder providing for recording of alternating synchronization codes; and
   the means for identifying synchronization codes in said data words is programmed to looking for and act on said alternating synchronization codes.

3. Apparatus for processing digital information as recited in claim 1, wherein the apparatus functions by looking for any synchronization code, and upon finding a synchronization code counting to where a next synchronization code should be, and reflecting the present and absence of proper synchronization codes respectively as pluses and minuses together and, when a sum thereof equals a desired number, declaring synchronization and when a sum thereof equals zero, declaring synchronization not found and the process of looking for any synchronization code restarted.

4. A method for accurately acquiring synchronization of digital data words coming off of a permanent media during playback including the steps of,
   looking for any synchronization code;
   counting ahead a certain number of bits in the data word and looking for a proper synchronization code;
   continuing counting ahead the certain number of bits in each data word and looking for proper synchronization codes;
   subtracting failures to locate proper synchronization codes from located proper synchronization codes;
   upon locating (n) proper synchronization codes, declaring synchronization and beginning playback; and
   where properly located synchronization codes less failures to locate proper synchronization codes equal zero, declaring synchronization not found and looking again in the data flow for any synchronization code.

* * * * *